(12) United States Patent
Harris et al.

(10) Patent No.: US 9,942,894 B2
(45) Date of Patent: Apr. 10, 2018

(54) DATA DISTRIBUTION BY PROXY

(71) Applicant: SONY INTERACTIVE ENTERTAINMENT AMERICA LLC, San Mateo, CA (US)

(72) Inventors: Adam Harris, San Diego, CA (US); William McCarroll, San Diego, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 470 days.

(21) Appl. No.: 14/488,109

(22) Filed: Sep. 16, 2014

(65) Prior Publication Data

US 2015/0003332 A1    Jan. 1, 2015

Related U.S. Application Data

(63) Continuation of application No. 11/067,100, filed on Feb. 25, 2005, now Pat. No. 8,837,528.

(51) Int. Cl.
*H04W 72/04* (2009.01)
*H04W 88/04* (2009.01)
*H04L 29/08* (2006.01)
*H04W 84/18* (2009.01)

(52) U.S. Cl.
CPC ......... *H04W 72/0446* (2013.01); *H04L 67/14* (2013.01); *H04W 88/04* (2013.01); *H04W 84/18* (2013.01)

(58) Field of Classification Search
None
See application file for complete search history.

(56) References Cited

U.S. PATENT DOCUMENTS

| 4,367,458 A | 1/1983 | Hackett |
| 4,569,015 A | 2/1986 | Dolev et al. |
| 5,018,021 A | 5/1991 | Slater |
| 5,107,489 A | 4/1992 | Brown et al. |
| 5,313,467 A | 5/1994 | Varghese et al. |
| 5,392,278 A | 2/1995 | Teel et al. |
| 5,416,779 A | 5/1995 | Barnes et al. |
| 5,481,178 A | 1/1996 | Wilcox et al. |

(Continued)

FOREIGN PATENT DOCUMENTS

WO    WO 2006/093597    9/2006

OTHER PUBLICATIONS

Adya, A. et al., "A Multi-Radio Unification Protocol for IEEE 802.11 Wireless Networks," Microsoft Technical Report MSR-TR-2003-44, Jul. 2003.

(Continued)

*Primary Examiner* — Chirag Shah
*Assistant Examiner* — Srinivasa Reddivalam
(74) *Attorney, Agent, or Firm* — Polsinelli LLP

(57) ABSTRACT

A communication device communicates with an originating device during an originating session and receives originating data from the originating device over a wireless communication link and then communicates with a receiving device during a receiving session and sends the originating data to the receiving device over a wireless communication link, such that the originating session and the receiving session occur at different times, and at least one of the sessions is an ad hoc communication session.

18 Claims, 7 Drawing Sheets

(56) References Cited

U.S. PATENT DOCUMENTS

| | | |
|---|---|---|
| 5,522,087 A | 5/1996 | Hsiang |
| 5,543,591 A | 8/1996 | Gillespie et al. |
| 5,548,784 A | 8/1996 | Easley, Jr. et al. |
| 5,675,571 A | 10/1997 | Wilson |
| 5,737,311 A | 4/1998 | Wyld |
| 5,764,158 A | 6/1998 | Franklin et al. |
| 5,880,411 A | 3/1999 | Gillespie et al. |
| 6,041,329 A | 3/2000 | Kishi |
| 6,049,539 A | 4/2000 | Lee et al. |
| 6,057,845 A | 5/2000 | Dupouy |
| 6,105,098 A | 8/2000 | Ninose et al. |
| 6,105,099 A | 8/2000 | Freitas et al. |
| 6,163,692 A | 12/2000 | Chakrabarti et al. |
| 6,327,624 B1 | 12/2001 | Mathewson, II et al. |
| 6,360,275 B1 | 3/2002 | Chu et al. |
| 6,484,221 B1 | 11/2002 | Lorinser et al. |
| 6,505,342 B1 | 1/2003 | Hartmann et al. |
| 6,539,424 B1 | 3/2003 | Dutta |
| 6,546,448 B1 | 4/2003 | Lai et al. |
| 6,553,003 B1 | 4/2003 | Chang |
| 6,553,030 B2 | 4/2003 | Ku et al. |
| 6,574,234 B1 | 6/2003 | Myer et al. |
| 6,610,936 B2 | 8/2003 | Gillespie et al. |
| 6,625,722 B1 | 9/2003 | Lancaster |
| 6,687,817 B1 | 2/2004 | Paul |
| 6,701,344 B1 | 3/2004 | Holt et al. |
| 6,714,966 B1 | 3/2004 | Holt et al. |
| 6,732,147 B1 | 5/2004 | Holt et al. |
| 6,750,852 B2 | 6/2004 | Gillespie et al. |
| 6,754,233 B1 | 6/2004 | Henderson et al. |
| 6,754,845 B2 | 6/2004 | Kursawe et al. |
| 6,756,783 B2 | 6/2004 | Brune et al. |
| 6,757,543 B2 | 6/2004 | Moran et al. |
| 6,829,634 B1 | 12/2004 | Holt et al. |
| 6,910,069 B1 | 6/2005 | Holt et al. |
| 6,920,497 B1 | 7/2005 | Borassa et al. |
| 6,990,338 B2 | 1/2006 | Miller et al. |
| 7,027,773 B1 | 4/2006 | Mcmillin |
| 7,280,519 B1 | 10/2007 | Shane |
| 7,324,972 B1 | 1/2008 | Oliver et al. |
| 8,160,082 B2 | 4/2012 | Harris |
| 8,837,528 B2 | 9/2014 | Harris |
| 2002/0036989 A1* | 3/2002 | Payton ............... H04L 12/1854 370/254 |
| 2002/0037699 A1 | 3/2002 | Kobayashi et al. |
| 2002/0041584 A1 | 4/2002 | Sashihara |
| 2002/0060994 A1 | 5/2002 | Kovacs |
| 2002/0188360 A1 | 12/2002 | Muramori et al. |
| 2003/0037033 A1 | 2/2003 | Nyman |
| 2003/0055892 A1 | 3/2003 | Huitema et al. |
| 2003/0076842 A1 | 4/2003 | Johansson |
| 2003/0119537 A1 | 6/2003 | Haddad |
| 2004/0063458 A1 | 4/2004 | Hori et al. |
| 2004/0105401 A1 | 6/2004 | Lee |
| 2004/0111141 A1 | 6/2004 | Brabec et al. |
| 2004/0160943 A1 | 8/2004 | Cain |
| 2004/0162059 A1 | 8/2004 | Hiltunen et al. |
| 2004/0210657 A1* | 10/2004 | Narayanan ............... H04L 29/06 709/227 |
| 2004/0233855 A1 | 11/2004 | Gutierrez et al. |
| 2004/0240457 A1* | 12/2004 | Habetha ............. H04L 12/4625 370/401 |
| 2005/0036616 A1 | 2/2005 | Huang et al. |
| 2005/0086287 A1 | 4/2005 | Van Datta |
| 2005/0086288 A1 | 4/2005 | Van Datta et al. |
| 2005/0086329 A1 | 4/2005 | Van Datta et al. |
| 2005/0086350 A1 | 4/2005 | Mai |
| 2005/0086369 A1 | 4/2005 | Mai et al. |
| 2005/0097386 A1 | 5/2005 | Van Datta et al. |
| 2005/0157749 A1 | 7/2005 | Lee |
| 2005/0182937 A1* | 8/2005 | Bedi ...................... H04L 9/083 713/171 |
| 2005/0286426 A1 | 12/2005 | Padhye |
| 2006/0126611 A1* | 6/2006 | Kelly ................ H04L 29/12283 370/389 |
| 2006/0133328 A1* | 6/2006 | Levendel .............. H04W 40/24 370/338 |
| 2006/0146704 A1 | 7/2006 | Ozer |
| 2006/0193283 A1 | 8/2006 | Harris |
| 2007/0082674 A1 | 4/2007 | Pederson et al. |

OTHER PUBLICATIONS

Bahl, R. et al., "SSCH: Slotted Seeded Channel Hopping for Capacity Improvement in IEEE 802.11 Ad-Hoc Wireless Networks," ACM MobiCom, Philadelphia, PA, Sep. 2004.

Cavin, David et al., "On the Accuracy of MANET Simulators," ACM, Toulouse, France, Oct. 2002.

Chin, Kwan-Wu et al., "Implementation Experience with MANET Routing Protocols," ACM SIGCOMM, Nov. 2002.

Corson, M. Scoti et al., "Internet-Based Mobile Ad Hoc Networking," IEEE Internet Computing, 1999.

Draves, R. et al., "Comparison of Routing Metrics for Static Multi-Hop. Wireless Networks," ACM SIGCOMM, Portland, OR, Aug. 2004.

Draves, R. et at., "Routing in Multi-Radio, Multi-Hop Wireless Mesh Networks," ACM MobiCom, Philadelphia, PA, Sep. 2004.

Holland, G. et al., "A Rate-Adaptive MAC Protocol for Multi-Hop Wireless Networks," ACM MobiCom 2001, Rome, Italy, Jul. 2001.

Jain, K. et al., "Impact of Interference on Multi-hop Wireless Network Performance," ACM MobiCom, San Diego, CA, Sep. 2003.

Kooser, Amanda C., "The Mesh Pit: Taking Wireless Networks to the Next Level," Entrepreneur Magazine, May 2004.

Kramer, Kwindla Hultman et al., "Tutorial: Mobile Software Agents for Dynamic Routing," MIT Media Lab, Mar. 1999.

Packethop, Inc., "Connectivity that Moves You: PacketHop Mobile Mesh Networking," Belmont, California, Copyright 2003.

Qiu, L. et al., "Troubleshooting Multihop Wireless Networks," Microsoft Technical Report, Microsoft Research-TR-2004-11, Nov. 2004.

Qiu, L. et at., "Optimizing the Placement of Integration Points in Multi-Hop Wireless Networks," IEEE ICNP 2004.

University of Rochester, "Computer Networks—Introduction," CSC 257/457 (Fall 2002), Sep. 9, 2002.

Wattenhofer, R. et al. "Distributed Topology Control for Power Efficient Operation in Multihop Wireless Ad Hoc Networks," IEEE INFOCOM 2001.

PCT Application No. PCT/US06/002584 International Search Report and Written Opinion dated Jun. 12, 2006.

European Patent Application No. 09008306.4, Examination Report dated May 3, 2012.

U.S. Appl. No. 11/067,100 Final Office Action dated Jan. 9, 2014.

U.S. Appl. No. 11/067,100 Office Action dated Aug. 15, 2013.

U.S. Appl. No. 11/067,100 Final Office Action dated Dec. 3, 2008.

U.S. Appl. No. 11/067,100 Office Action dated Feb. 21, 2008.

U.S. Appl. No. 12/534,765 Final Office Action dated Nov. 26, 2010.

U.S. Appl. No. 12/534,765 Office Action dated Jun. 23, 2010.

\* cited by examiner

DATA DISTRIBUTION BY PROXY

CROSS-REFERENCE TO RELATED APPLICATIONS

The present application is a continuation and claims the priority benefit of U.S. patent application Ser. No. 11/067,100 filed Feb. 25, 2005, the disclosure of which is incorporated by reference.

BACKGROUND OF THE INVENTION

Field of the Invention

The present invention relates generally to computer networks and, more particularly, to networks in which devices communicate in ad hoc fashion to transfer data.

Description of the Related Art

The phrase "computer network" generally refers to a collection of computers that communicate with each other over a shared network medium. The computers can comprise all manner of processing devices that can communicate using an appropriate network protocol, such as laptop computers, hand-held devices, personal digital assistants (PDAs), and the like.

The shared medium for the network is often a sequence of wired connections, such as electrically conductive wiring or cabling. The medium can include optical fiber connections. The network shared medium can also comprise electromagnetic spectrum, such as communications using satellites, terrestrial towers, or other radio frequency (RF) connections.

Networks are useful for sharing data (including messages, audio information, video information, and documents in digital form) among online computers that comprise nodes of the network. When a user is "online", the user is actively communicating over the network medium and is capable of communicating with one or more other computers that are also connected to the shared medium. Users who are not online (i.e., at computers that are not nodes of a network) cannot send or receive messages over the network. Computer users who are not online are generally said to be "offline".

In the computer gaming context, it is desirable to share data such as game scores, player rankings, and tournament associations. For example, U.S. patent application No. 2002/0188360 to Muramori describes a system in which network game tournaments can be organized via registration of competitions. A player can play offline, without interaction with other players, and the offline player's individually-achieved score can be uploaded to the network later, when the player completes login to the network. In this way, players can get online and can then compare scores achieved by other players, view rankings, check tournament results, and the like. Any player with access to the appropriate network (such as the Internet) can participate in the network game tournament system. Networks with fixed resources, such as servers whose physical location does not change, will be referred to as fixed networks.

Mobile devices, such as network-enabled wireless hand-held devices and cell phones, or laptop computers, can connect to a network at different places and at different times. They can operate offline and can connect online later, for network communications. In this document, mobile devices will also be referred to as wireless devices. Computing devices that are connected to a network through a wired or cable connector from the device itself will be referred to as wired devices.

Ad hoc networks (also called mesh networks) are created when a group of devices are in direct communication with each other at the same time (comprising a communication session) after a setup process in which the devices negotiate their network addresses for communication. That is, the members of the ad hoc network communicate with each other in real time, and the paths or links over which the ad hoc members communicate are established in a negotiation or setup procedure in which the members obtain a network address. The ad hoc network paths for communication are active while the members are online and in direct communication with each other, and otherwise the links do not exist. Thus, an ad hoc network is in contrast to a fixed network, in which network members communicate over network infrastructure through fixed network addresses. In any network environment, ad hoc or fixed, the communicating members can be wireless devices or wired devices.

Examples of fixed wireless networks include WLAN or "WiFi" networks that communicate through an access point over the IEEE 802.11 standard, as well as Bluetooth networks. For example, a laptop computer user can communicate wirelessly with a network access point such as a WiFi router, which itself might be connected to a high speed data line via copper coaxial cable, which ultimately travels over optical fiber to an Internet server. The network access point will typically assign a fixed network address to the laptop.

Alternatively, for an ad hoc network environment, two wireless devices may begin communications by broadcasting their presence and, upon detecting the presence of the other, the two may complete processing to establish wireless communications with each other. Such an arrangement is said to comprise a wireless ad hoc network. By means of such an ad hoc network, the two wireless devices can communicate with each other. When the devices break off communications, such as when one or both leave the vicinity of the other, or when one or both shut down, then the ad hoc network ceases to exist.

Some mobile devices are capable of multi-mode network operation. For example, some devices are capable of three modes of operation: (a) offline operation, in which a player might use the mobile device to play a game in solitude without an active connection to a network of any kind, (b) online operation to a fixed network infrastructure, such as where the user is connected to other players via a network (such as the Internet) and engages in interactive gaming communication with the other players, and (c) ad hoc network operation, in which users can be in direct communication with other players to establish an ad hoc network for gaming amongst the directly communicating players.

Although members of ad hoc networks can participate in data exchange between each other while they are connected together, they cannot exchange data with users to whom they are not actively connected. To effect a data exchange, the sending user and the receiving user must be actively communicating with each other at the same time. When they are actively communicating, they comprise an ad hoc network over which they can exchange data. Alternatively, if the sending user and the receiving user each have access to a fixed network, such as the Internet, the data can be exchanged over two links, or "hops". First, the sending user can send data to the network, where it can be routed to a server or temporarily stored. The data can then be forwarded from the server over the Internet, or retrieved from storage, for reception at the receiving user.

Not all users who can connect to others via ad hoc networks can also connect to others via conventional networks. For example, access to the Internet generally requires that a user establish an appropriate service account with an access provider. Such service accounts generally are fee-based and require payment of access charges or subscription fees. Consequently, only those ad hoc users who have multi-mode devices and who pay for Internet access will be able to get online, notwithstanding their ability to communicate directly with others over an ad hoc network connection.

It would be desirable to permit greater flexibility in exchanging data among mobile ad hoc users who are not necessarily directly connected to intended recipients or to the online network.

Thus, there is a need for an improved, more efficient data exchange technique across offline, online, and ad hoc operating environments. The present invention satisfies this need.

SUMMARY

A communication device communicates with an originating device during an originating session and receives originating data from the originating device over a wireless communication link and then communicates with a receiving device during a receiving session and sends the originating data to the receiving device over a communication link, such that the originating session and the receiving session occur at different times, and at least one of the sessions is an ad hoc communication session. In this way, data is sent from the originating device to the receiving device through the communication device, automatically and without direct communication between the originating device and the receiving device. This enables a device to pass data over a fixed network, such as the Internet, without ever actually connecting to the fixed network, so long as the device can establish communication over an ad hoc network and pass the data to a communication device that can get the data to the fixed network. This provides more efficient data exchange across communication devices utilizing at least one communication hop over an ad hoc network, thereby comprising a "data by proxy" transfer.

The originating data can optionally be validated and authenticated, in separate processes or in a single combined operation, as desired. Thus, the communication device that receives the originating data can validate the data to ensure that the data is valid and can authenticate the data to ensure that the originating device is an authorized data source. If validation and authentication are successful, the communication device sends the validated and authenticated data to a receiving device over a wireless communication link. In this scenario, the data includes information that uniquely identifies the originating device that is the source of the data, and no direct communication takes place between the originating device and the receiving device.

If desired, the data exchange can be self-limiting, by providing for automatic limiting of data propagation. For example, the data can include an expiration time, and the communication device can decline to send the data if the expiration time has passed. The data can include time data that identifies an origination time at which the data was first generated, and the communication device can decline to send the data if the sent time is greater than a current time by at least a sending limit time value. The data can be checked against a message hop count value that is incremented with each sending of the message. The message is not sent if the hop count exceeds a predetermined limit value.

Many types of data can be sent using these techniques. For example, the data can include message data intended for a network device comprising a network node. In addition, the data can be generated by a network device comprising a network node, or the data can be generated by the communication device. The data can include status information for a software application. The data can include update information for a software application. If the data relates to a software application, then the software application can be installed on the communication device.

Other features and advantages of the present invention should be apparent from the following description of the preferred embodiment, which illustrates, by way of example, the principles of the invention.

DETAILED DESCRIPTION

Figure 1:
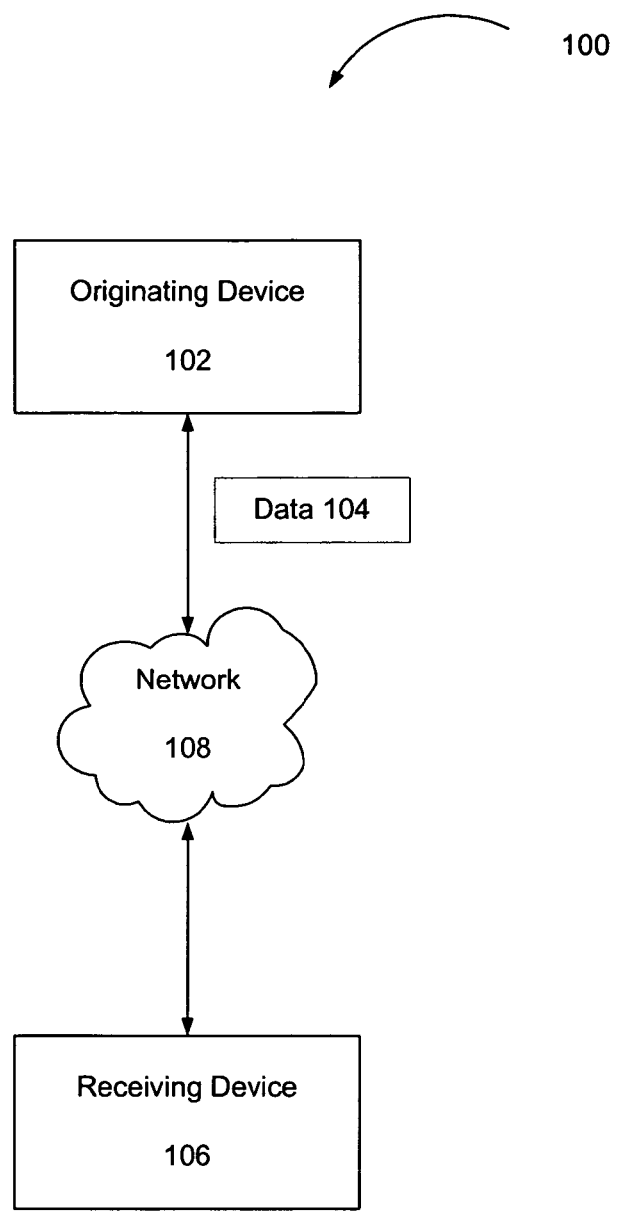
FIG. 1 is a schematic illustration of a computer ad hoc network constructed in accordance with the present invention.

FIG. 1 is an illustration of a computer system 100 constructed in accordance with the present invention. A wireless communication device comprising an originating device 102 exchanges data 104 to and from a receiving device 106 over a network 108. The originating device 102 can comprise any computing device that is capable of ad hoc wireless communication with one or more wireless-capable devices. Similarly, the receiving device 106 can comprise any computing device that is capable of ad hoc wireless communication with one or more wireless-capable devices. The network 108 comprises multiple communication links, or "hops", utilizing one or more intervening communication devices, such that at least one of the hops is over an ad hoc network.

One of the devices 102, 106, 108 can comprise, for example, a server or router on a local area network (LAN) or on a wide area network such as the Internet. In accordance with an embodiment of the invention, the originating device 102 exchanges data with the receiving device 108 such that the originating device can pass data over a fixed network, such as the Internet, without ever actually connecting to the fixed network, so long as the originating device can establish communication over an ad hoc network and pass the data to a communication device that can get the data to the fixed network. The communication device can get the data to the fixed network because the communication device itself connects to the fixed network, or because the communication device communicates with one or more receiving devices such that the last device in a chain connects to the fixed network. This provides more efficient data exchange across communication devices utilizing at least one communication hop over an ad hoc network.

That is, the sending of data from the originating device 102 to subsequent communication devices over network hops 108 is continued from communication device to communication device in "hops" until the data is ultimately received at a receiving device 106. At each hop, the devices in communication will automatically detect the data to be sent and will implement the data transfer, if appropriate in view of any validation and authentication operations as discussed below. The receiving device 106 generally comprises a computer having a fixed network location, such as an Internet server or gateway computer, but can be a portable, hand-held wireless communication device such as a Web-enabled cell phone or PDA. The originating device 102 generally comprises a wireless device such as a portable game console, a Web-enabled PDA, a laptop computer, or a Web-enabled cell phone. The communication devices making up the network 108 can be similar devices. Thus, the originating device can exchange data with a receiving communication device over an ad hoc network, and the data can be repeatedly passed from communication device to communication device over ad hoc connections, until ultimately the data reaches a network node receiving device. In this way, the originating device can communicate with a network node receiving device without ever communicating directly with the receiving device, so that data propagation from the originating device can proceed while the originating device is offline. Thus, data is transferred across the network by proxy.

More particularly, in the context of the illustrated embodiments, the network 108 includes wireless communication devices such that at least one is adapted for communication with a fixed network node receiving device 106, so that an originating device can exchange data with the network node even without the originating device having network access to the network node. It should be understood that the originating device 102 is not in direct communication with the receiving device 106 when the data is received at the receiving device.

In FIG. 1, the data 104 is represented by a block adjacent the originating device 102, but it should be understood that the data 104 is sent over the network 108 to and from the receiving device 106. It also should be understood that the data 104 can comprise many different types of network messages. For example, the data 104 can comprise player scores, rankings, or tournament results for various game titles, or the data 104 can comprise software application update information, or the data 104 can comprise email messages.

As noted above, multiple data exchanges can take place between the device 102 that originates a data message (generates the data) and the last exchange, or "hop", from a device of the network 108 to the network node receiving device 106. Each of the data exchanges can take place without user intervention. That is, each device is adapted to detect when it has data to be sent using the proxy technique described above. In response, such transfer will be initiated for a communication session. It should be understood that the data exchanges can be two-way. Thus, in general, the description provided herein will be from the perspective that the originating communication device 102 generates data for sending, but it should be understood that data can be received at the communication device 102 from another device, such as one of the member devices 108, or the network node 106.

The system 100 can provide validation and authentication services, if greater data security is desired. In that scenario, the originating data 104 that is sent over the network 108 includes information that uniquely identifies an originating device that is the source of the data. The communication device that receives the data and is to pass it along for the next hop over the network 108 will validate the data to ensure that the data is valid and will authenticate the data to ensure that the originating device is an authorized data source. The communication device will not send the data along if validation fails or if authentication fails. This ensures network integrity and provides more efficient data exchange across communication devices via ad hoc networks.

Figure 2:
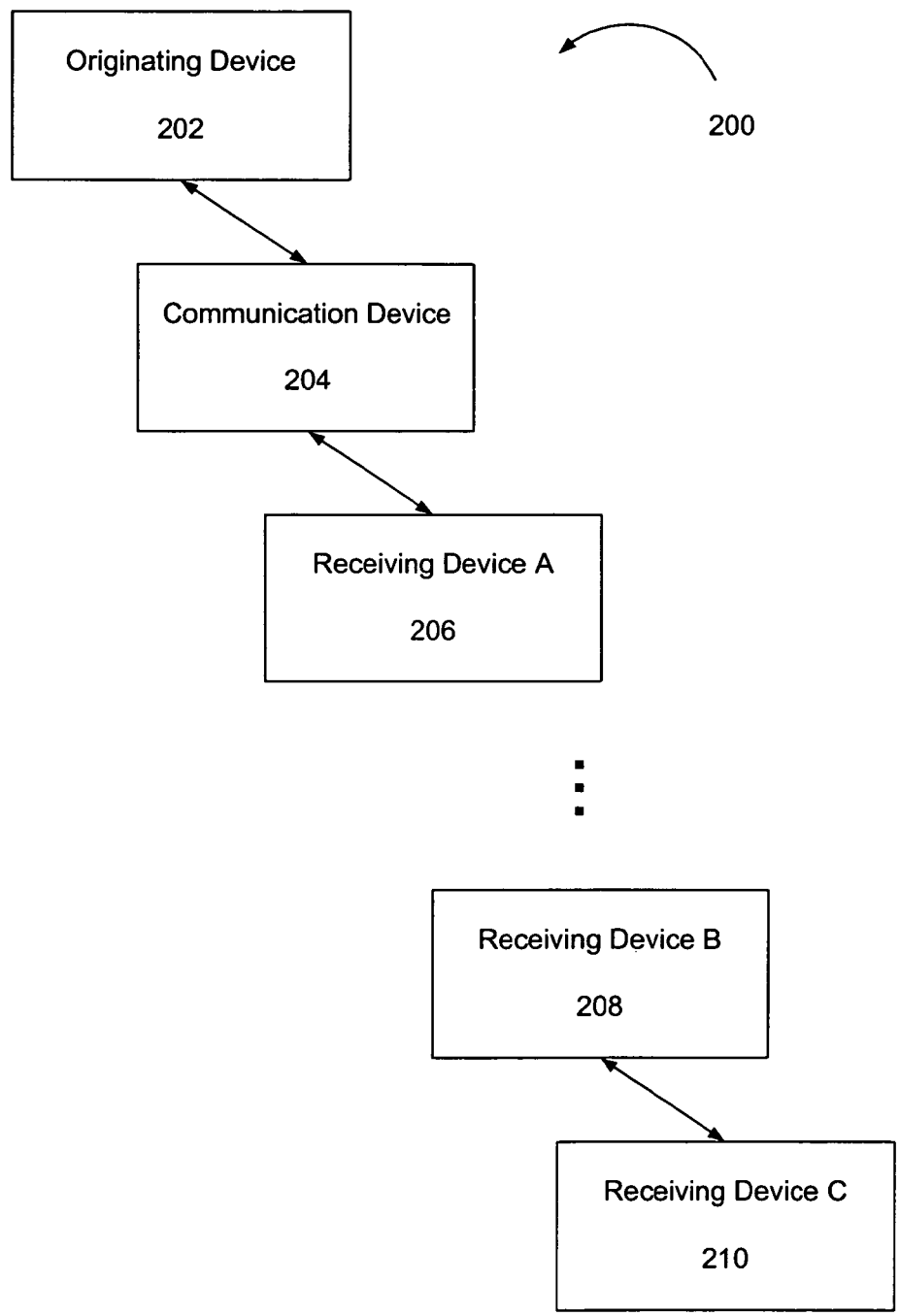
FIG. 2 is a schematic illustration of data flow in an ad hoc network in accordance with the present invention.

FIG. 2 provides a schematic illustration 200 of data flow in a network in accordance with an embodiment of the present invention. An originating device 202 generates data for sending. The originating device 202 sends the originating data to a communication device 204 over a wireless communication link. In this example, the originating device 202 and the communication device 204 comprise an ad hoc network. Thus, the two devices will establish communications with each other via a network address negotiation procedure, and will exchange data using a transfer protocol that is appropriate for the network. In the FIG. 2 embodiment, the communication device validates and authenticates the data, and if the data is validated and authenticated, the communication device will send the data along to a receiving device, designated Receiving Device A 206 in FIG. 2. The Receiving Device A will also perform the optional validation and authentication, and will send the data along to another device, and this process will occur repeatedly (indicated by the ellipses in FIG. 2) until the data reaches a Receiving Device B 208 and then a Receiving Device C 210, such that the Receiving Device C comprises a network node, such as a server on the Internet or other fixed network. Thus, each communication device will perform validation and authentication, as described further below, before sending along the data. In this way, multiple pairwise device connections are made, from device 202 to communication device 204 and from communication device 204 to device 206 and so forth to the last device 210. Alternatively, the data can be sent from the originating device 202 to the communication device and then from the communication device 204 directly to a receiving device 210 in but two hops. In accordance with the invention, at least one of the communication hops is over an ad hoc network, thus providing network communications through devices where such access would otherwise be unobtainable.

Figure 3:
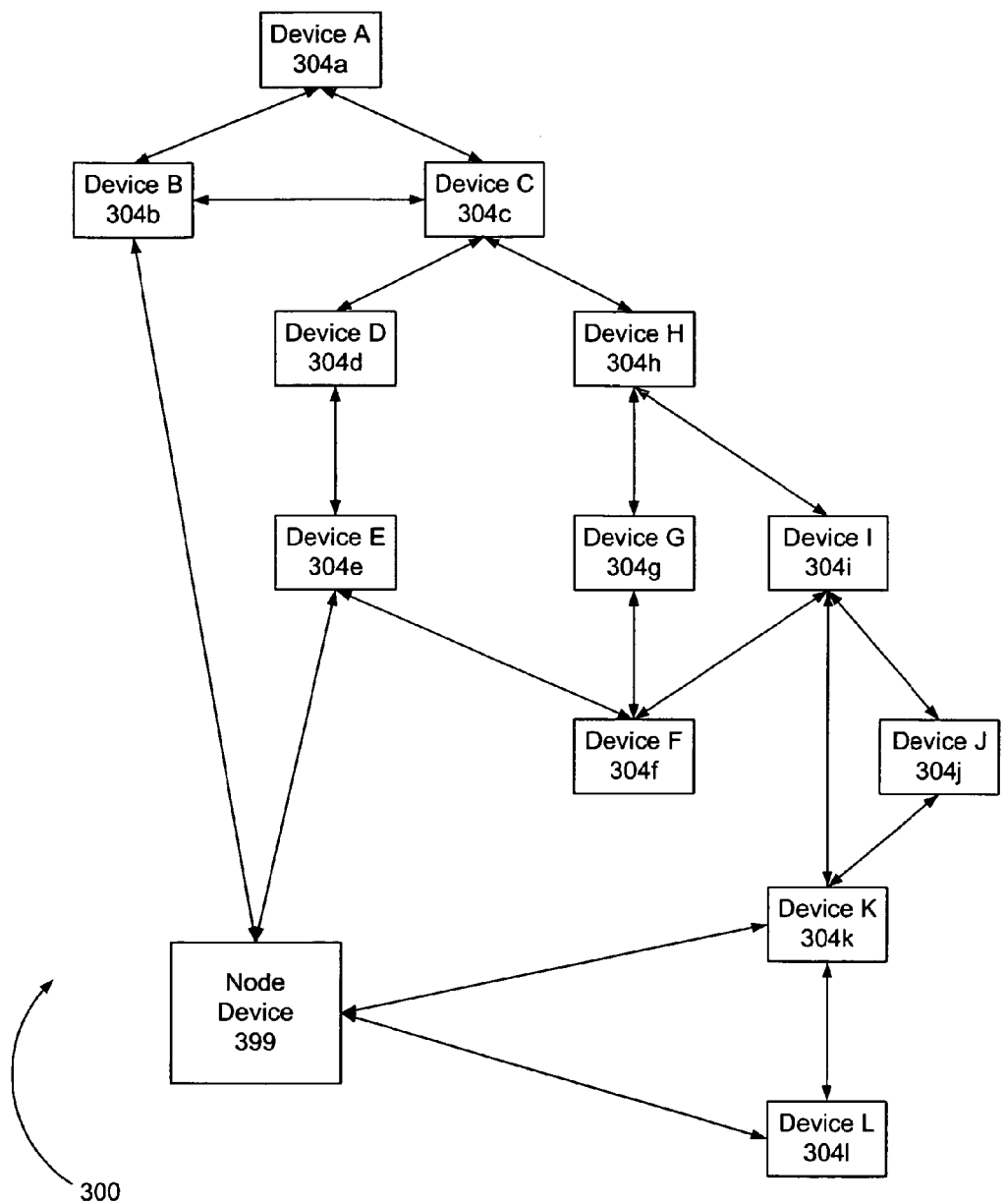
FIG. 3 is a schematic illustration of multiple ad hoc network connections for operation in accordance with the present invention.

FIG. 3 is a schematic illustration of a system diagram 300 that shows multiple scenarios for data exchange in accordance with the present invention. More particularly, FIG. 3 shows various ways in which data might be exchanged between Device A 304*a* and a Node 399. In FIG. 3, the communication devices identified as Device A, Device B, Device C, and so forth through Device L are all identified as 304 with a respective letter suffix (a, b, c, . . . , l) to indicate that all the devices are capable of operation in accordance with the invention, meaning that all are capable of wireless communication with each other, and all can be members of respective ad hoc networks. A reference to devices without specifying a suffix letter will be understood to be a reference to the devices collectively. In the FIG. 3 embodiment, all the devices 304 will perform appropriate validation and authentication operations before forwarding received data.

Multiple communication scenarios are possible with the FIG. 3 system. For example, a first ad hoc network can be comprised of Device A 304*a*, Device B 304*b*, and Device C 304*c*. Thus, Device A, Device B, and Device C can communicate with each other over wireless connections so that all may share data with each other. During such data exchanges, Device B can receive data from Device A, wherein the received data is intended for the network Node 399. After the three ad hoc network devices 304*a*, 304*b*, 304*c* terminate their communications with each other, Device B 304*b* can connect to a fixed network via the Node 399. In accordance with the invention, Device B will validate and authorize the data it received from Device A and, if such operations are successful, Device B will supply the Node 399 with the data. In this way, Device B will send along the data from Device A to the Node 399. It should be noted that Device A has not itself connected directly to the fixed network Node 399 or to any network of which the Node 399 is a member. That is, the data has been propagated from the originating device, Device A, to the network Node 399 while the originating device was offline.

In another scenario, Device A, Device B, and Device C can disconnect from each other, terminating their A-B-C ad hoc network, and then Device C can connect to a different ad hoc network that includes itself, Device D, Device E, Device F, Device G, and Device H. Connecting arrows for all the device connections are not shown for simplicity of illustration, but it should be understood that all members of the C-D-E-F-GH ad hoc network can communicate with each other. In accordance with the invention, Device C 304*c*, which received the data from Device A in the earlier ad hoc network, will perform validation and authentication, and then will send the data along to the members of its new ad hoc network. Thus, the communication devices of this C-D-E-FG-H ad hoc network will share the data that Device C originally received from Device A. After a time, the devices of the C-D-E-F-G-H ad hoc network can disconnect from each other, terminating that ad hoc network. FIG. 3 shows that one of the devices, Device E 304*e*, can connect to the Node 399. In accordance with the invention, the communication device 304*e* will send the data to the Node 399, after validation and authentication. Thus, the originating data has made its way from Device A to Device C and from Device C to Device E, and then from Device E to the Node 399, a sequence of three links or hops. Once again, the data has proceeded from the originating Device A to the Node 399 without the originating device ever connecting directly to the network node 399 or to any network of which the Node 399 is a member.

FIG. 3 shows yet another ad hoc network that may be constituted, this one including Device F 304*f*, Device G 304*g*, Device H 304*h*, and Device I 304*i*. That is, some time after the C-D-E-F-G-H ad hoc network is terminated, communication devices can form up a F-G-H-I ad hoc network. Preferably, each of the devices F, G, and H will have previously received the data from Device C. Thus, the data will be exchanged with Device I upon creation of the F-G-H-I ad hoc network. None of the devices in the F-G-HI ad hoc network is indicated as connecting to the Node 399, so the data is not sent on.

FIG. 3 indicates that another ad hoc network I-J-K is made up of corresponding communication devices: Device I 304*i*, Device J 304*j*, and Device K 304*k*. Therefore, in accordance with the invention, Device I will have received the data from one or all of Device F, G, and H, which in turn will have received the data from Device C, which will have received the data in the A-B-C ad hoc network. In accordance with the invention, the data will be exchanged among the members of the I-J-K ad hoc network. FIG. 3 indicates that Device K is capable of direct communication with the Node 399. Therefore, when Device K performs a login with the Node 399, Device K will send the data to the Node, after validation and authentication. Thus, the data will have made its way from the A-B-C ad hoc network to the C-D-E-F-G-H network, from that network to the F-G-H-I network, from there to the I-J-K network, and from there directly to the Node 399. Once again, it should be noted that the data has been sent from Device A to the Node 399 without Device A ever directly connecting to a network of which the Node 399 is a part.

The last ad hoc network indicated in FIG. 3 is the K-L network, comprised of Device K 304*k* and Device L 304*l*. Thus, after the I-J-K ad hoc network is terminated, Device K can connect to Device L in a K-L ad hoc network. FIG. 3 indicates that both Device K and Device L can communicate directly with the Node 399. Therefore, each of them can provide the Node 399 with the data, upon respectively performing a login operation with the Node 399.

In this way, multiple communication devices 304 that operate in accordance with the present invention can cooperate to form successive ad hoc networks and can help exchange data between an originating device, Device A 304*a*, and a receiving device, Node 399, all without the originating device ever connecting to a network of which the fixed Node is a member. In all of the data propagation scenarios illustrated in FIG. 3, data propagation after the initial sending from the first originating device (Device A) occurred while the originating device was offline. Thus, Device A was able to exchange data with the network Node 399 even though Device A was never in communication with the Node 399 and, in fact, was offline during all the scenarios described above.

Figure 4:
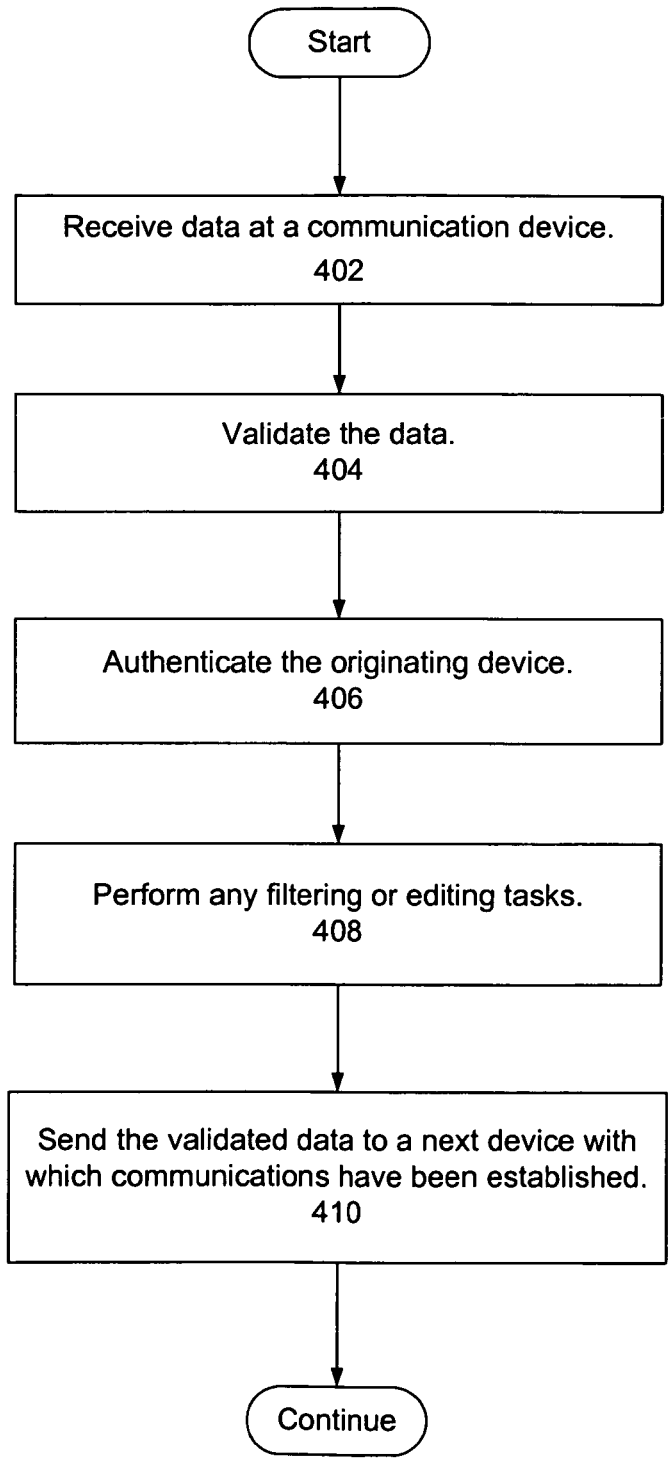
FIG. 4 is a flow diagram that illustrates processing at a communication device such as one of the communication devices illustrated in FIGS. 1, 2, 3.

FIG. 4 is a flow diagram that shows the sequence of operations performed by one of the communication devices constructed in accordance with the invention, for example, a device such as one of the devices 304 depicted in FIG. 3. The description of operations begins with receipt of originating data at a communication device. The originating data can comprise data created at the communication device or the originating data can be data received from an ad hoc network member. This data receipt operation is represented by the flow diagram box numbered 402. In the next operation 404, the communication device validates the data. The validation operation is an optional service that is performed to ensure that the originating data is in the proper format and can be correctly parsed to determine originating device, intended recipient, and data payload. For example, the validation operation might be used to verify that the machine identification number of the originating device is a valid number for the device type, to verify that the indicated receiving device is a proper Internet server, and to verify that the data payload relates to allegitimate application, such as comprising game tournament data related to an appropriate multi player network game, for which the receiving device is an Internet game server.

The next operation is for the communication device to perform authentication, as indicated at box 406. Authentication is an optional service that involves verifying that the originating device is authorized to be generating and sending the data. For example, access to the receiving device Internet game server might be limited to players who have enrolled in a tournament. If the data does not include information from which authorization can be confirmed, then the authorization process will fail. The authentication process can utilize a variety of schemes, such as public key cryptography or other types of encryption.

The validation 404 and authentication 406 are optional processes. The validation 404 and authentication 406 can be performed separately, or as a single combined operation, or one can be performed but not the other.

Next, indicated by the flow diagram box numbered 408, the communication device can perform optional filtering or editing tasks. For example, the originating data might include information that identifies when the data was first generated. If the communication device determines that the generation date of the data is beyond a time limit for data lifetime, then the communication device can decide to delete the message, or the device can send a failure message back to the originating device to indicate that the data will not be forwarded. Alternatively, the data might include an expiration date. The communication device can check a system clock value to determine a current date and time, which can be compared to the expiration date in the data. If the expiration date is passed, the communication device will delete the data or send a failure message. Thus, the communication device can perform a filtering operation.

Another optional operation 408 might comprise editing the data so as to update a message hop count. More particularly, the data can include a field comprising a message hop count that is incremented each time the data is passed from one ad hoc network to a different ad hoc network, or each time the data is passed from one communication device to another. The message hop count can be used to control or filter the number of times a data message is forwarded, or can be used to determine priority of sending or priority of storage, or other message handling decisions. Other message update or modification operations will occur to those skilled in the art, to ensure only appropriate data is propagated through the ad hoc communication system.

The filtering and editing tasks can be more effectively performed if the data includes message status information, such as a message hop count or a timestamp value that indicates when the data message was generated. The message hop count can comprise a field in each data message that can be checked and, if necessary, incremented by any receiving communication device. The timestamp value can be generated by the originating communication device upon generating the original data message. If desired, each device that handles (sends along) the data can append a timestamp value or can update the timestamp to indicate the message receipt time, message sending time, or other desired parameters. Thus, each communication device should perform appropriate operations to enable the desired filtering and editing options for data message handling.

The last operation 410 by the communication device is to send the data message to the next device in the ad hoc network of which it is currently a member or, if the communication device is communicating with a fixed network, to send the message to a fixed network node such as an Internet server or LAN node. In either case, at 410 the data is automatically sent without user intervention to initiate the sending.

Figure 5:
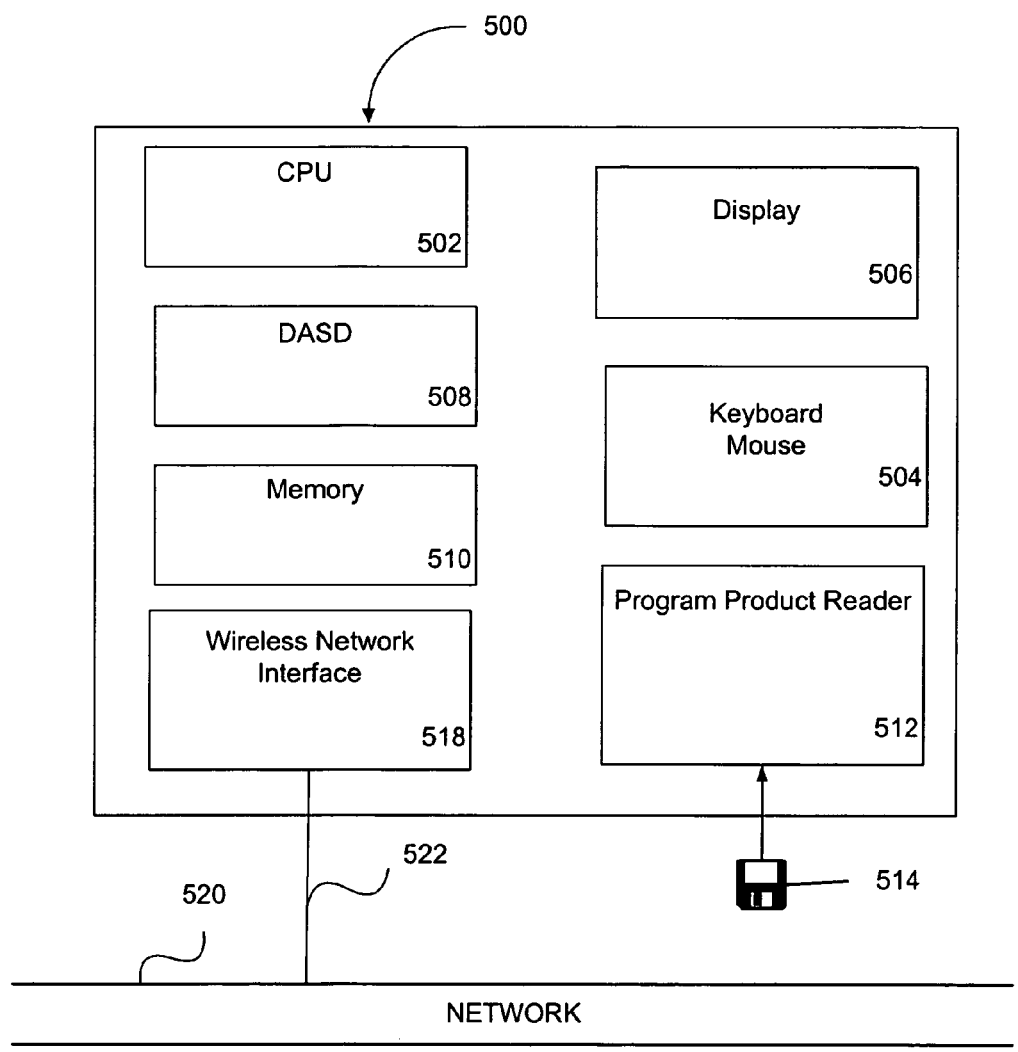
FIG. 5 is a block diagram of a communication device constructed in accordance with the present invention.

As noted above, the communication devices shown in the block diagram of FIGS. 1, 2, and 3 can comprise a variety of devices. One of the possible devices is a laptop personal computer (PC) that is capable of wireless communications. FIG. 5 is a block diagram of a wireless PC communication device in the systems of FIGS. 1, 2, and 3, illustrating the primary hardware components. Those skilled in the art will appreciate that the communication devices may all have a similar construction, or may have alternative constructions consistent with the capabilities described herein.

FIG. 5 shows an exemplary communication device 500 such as might comprise any of the communication devices in the systems of FIGS. 1, 2, and 3. The device 500 can comprise, for example, a wireless-enabled laptop computer or similar wireless-enabled computing device, such as a PDA, tablet computer, or the like. Each device 500 operates under control of a central processor unit (CPU) 502, such as a "Pentium" microprocessor and associated integrated circuit chips, available from Intel Corporation of Santa Clara, Calif., USA. A computer user can input commands and data from a keyboard and computer mouse 504, and can view inputs and computer output at a display 506. The display is typically a video monitor or flat panel display. The computer 500 also includes a direct access storage device (DASD) 508, such as a hard disk drive. The memory 510 typically comprises volatile semiconductor random access memory (RAM). Each computer preferably includes a program product reader 512 that accepts a program product storage device 514, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer 500 can communicate over a wireless medium with the others in the ad hoc network 520 through a wireless network interface 518 that enables communication over a wireless connection 522 between the network 520 and the computer. The network interface 518 typically comprises, for example, a wireless Network Interface Card (NIC) that utilizes one of the IEEE 802.11 standards or other wireless network communication standards.

The CPU 502 operates under control of programming steps that are temporarily stored in the memory 510 of the computer 500. When the programming steps are executed, the computer performs its functions. Thus, the programming steps implement the functionality described in FIG. 4. The programming steps can be received from the DASD 508, through the program product storage device 514, or through the network connection 522. The program product storage drive 512 can receive a program product 514, read programming steps recorded thereon, and transfer the programming steps into the memory 510 for execution by the CPU 502. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 510 over the network 520. In the network method, the computer receives data including program steps into the memory 510 through the network interface 518 after network communication has been established over the network connection 522 by well-known methods that will be understood by those skilled in the art without further explanation. The program steps are then executed by the CPU 502 thereby comprising a computer process.

It should be understood that all of the communication devices of the ad hoc network systems may have a construction similar to that shown in FIG. 5, so that details described with respect to the FIG. 5 device 500 will be understood to apply to all communication devices of the systems. It should be appreciated that any of the devices can have an alternative construction, so long as the device can communicate with the other communication devices over a network as illustrated in FIGS. 1, 2, and 3 and can support the functionality described herein.

Figure 6:
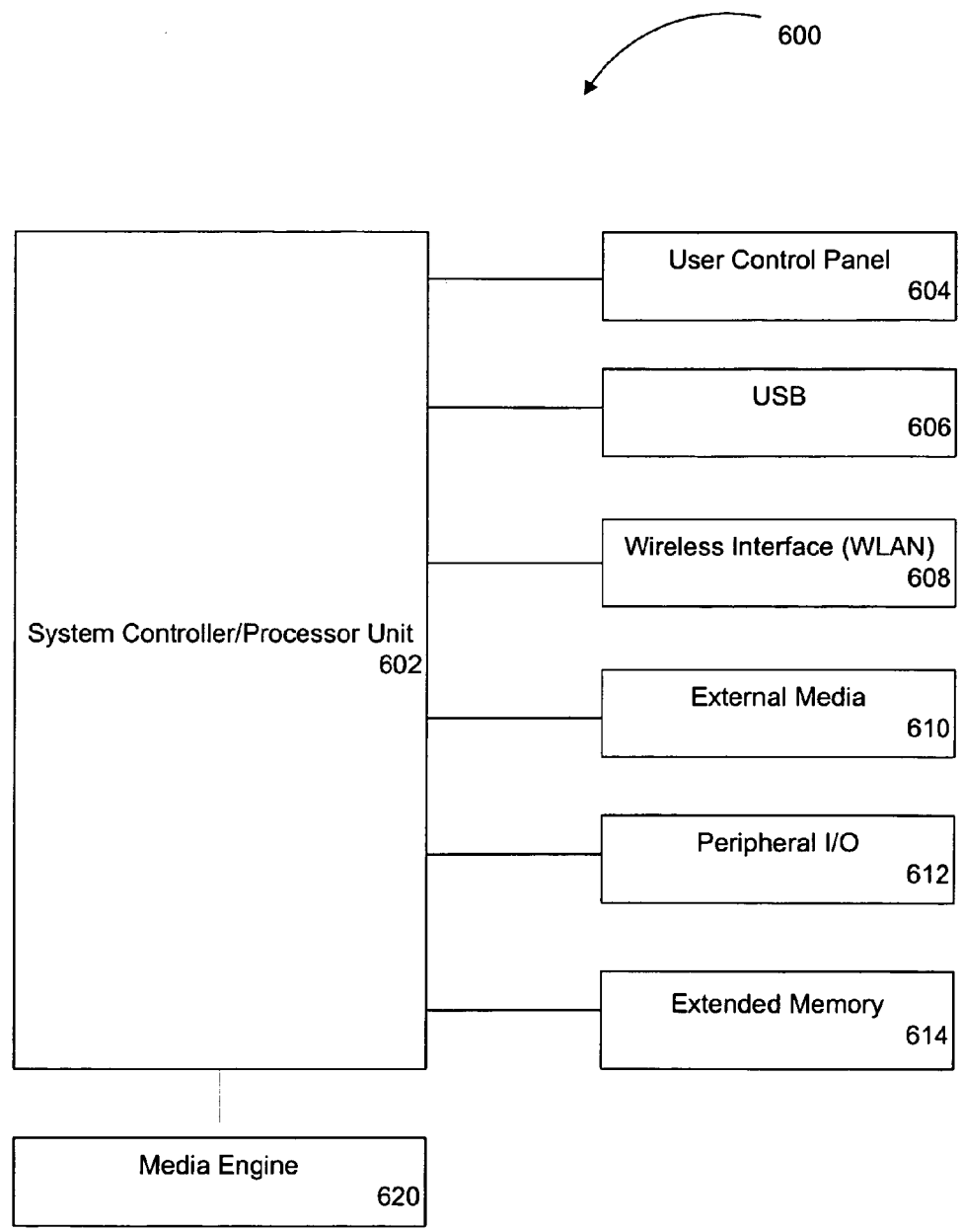
FIG. 6 is a block diagram of an alternative communication device constructed in accordance with the present invention.

For example, with reference to FIG. 6, the communication devices 304 can comprise a wireless enabled computer entertainment system, such as a portable video game system 600 including devices such as the "Playstation Portable"™ (PSP) product from Sony Corporation of Japan. FIG. 6 is a block diagram of an exemplary hardware configuration of the portable video game system 600.

The video game system 600 includes a "PSP Engine" comprising a system controller/processor unit 602 that includes a core central processor unit, floating point processor, video processor, random access memory (RAM), graphics processor, and the like, all communicating over a core high-speed bus. Communicating with the PSP Engine 602 are various input, output, and system resource units. For example, a user control panel 604 permits a user to provide control inputs for data entry and gaming control. A USB interface 606 permits communication between the PSP Engine and external devices that are compatible with the Universal Serial Bus (USB) standard or other device-to-device communications, such as IEEE1394 (also referred to as "i.Link", "Firewire", or "Lynx"). A wireless interface 608 permits wireless communication between the device 600 and a network (WLAN), such as via the IEEE 805.11 standard. An interface for external media 610 supports a variety of storage media, such as flash memory, "Memory Stick", and the like. A peripheral I/O block 612 provides interfaces for the system 600 with input/output units such as video displays, LCD devices, infrared devices (IrDA), joystick controllers, and the like. The I/O units may be integrated with the system or can be external, removable devices. The system 600 preferably includes support for extended memory 614, such that the system can communicate with extended memory cards (e.g., DRAM) and the like for supplementing the RAM of the system. The system preferably includes a Media Engine 620 for communications between the PSP Engine 602 and removable media for extended storage. The Media Engine is especially suited for interfacing with removable media intended for video data storage and retrieval, so that the interface incorporates high speed data transfer, large capacity, and reliable service. For example, data transfer speeds should be comparable to a LAN (in excess of 1 Mbps), and data capacity should be in excess of 1 GB.

The PSP Engine 602 includes a CPU that operates under control of programming instructions that are stored in RAM of the PSP Engine. The CPU is configured to process information and execute instructions in accordance with the programming instructions. The PSP Engine also includes a graphics processor unit (GPU) that is configured to perform drawing processes and formulate images in accordance with instructions received from the CPU. For example, the GPU may render a graphics image based on display lists that are generated by and received from the CPU. The GPU may include a buffer for storing graphics data. The GPU 610 outputs images to the peripheral I/O 612.

The wireless interface 608 is configured to enable operation of the communication device 600 in two wireless communication modes: an infrastructure mode and an ad hoc mode. In the infrastructure mode, the communication device can communicate with a wireless router or network access point, which typically are used for communication with a fixed network such as the Internet or a LAN. For example, the infrastructure mode can be used at a WiFi "hot spot" for network communications. In the ad hoc mode, the device 600 can communicate with other suitably configured wireless communication devices. The communication takes place directly with the other ad hoc network devices, in a peer-to-peer type of communication among the ad hoc network members. The particular ad hoc network will be established and identified via service set identification (SSID) information and channel information, which indicates a predetermined communications channel to be used among the ad hoc network members. Individual communication devices can be identified by a unique identification number, such as the conventional 48-bit MAC (media access control) address.

The external media 610 interface is configured to support a program reader, which can comprise, for example, an optical disk drive that accepts removable storage media such as a magnetic floppy disk, an optical CD-ROM disc, a CD-R disc, a CD-RW disc, a DVD disc, or the like. The external media includes various storage media to which the CPU 602 may write and store data, including memory cards that can be inserted and removed from the system 600.

Figure 7:
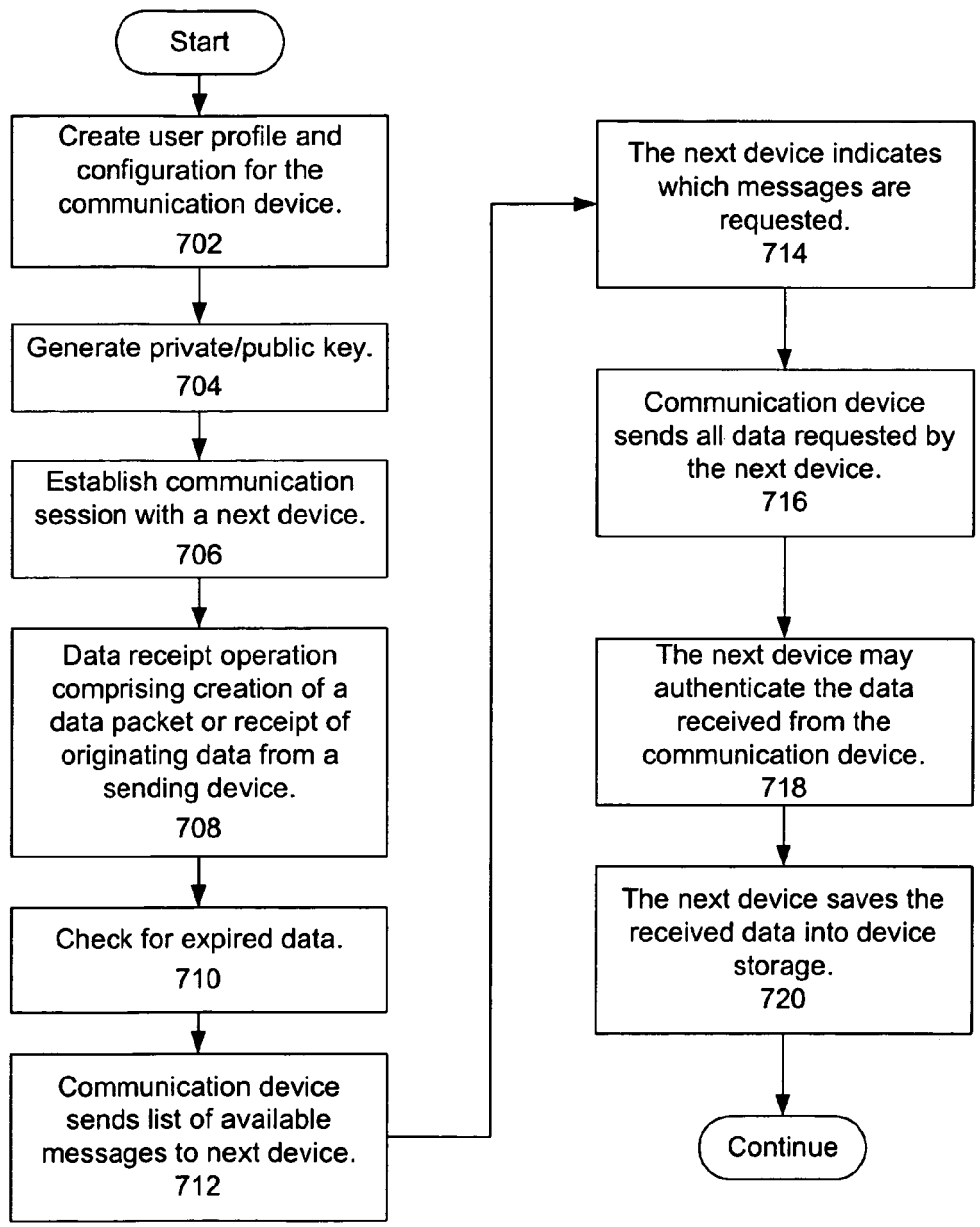
FIG. 7 is a flow diagram that illustrates processing at a communication device with authentication features.

As noted above, authentication and validation processes can be incorporated into the operation of the communication devices. FIG. 7 is a flow diagram that illustrates processing at a communication device with such operational features. Each of the devices 304 illustrated in FIG. 3 can be operated in a fashion similar to that described below, in addition to following the general sequence of operations described in connection with FIG. 4.

As illustrated in the first flow diagram box 702 of FIG. 7, when the communication device is first configured, a profile is created. The profile can include, for example, a user name, registration information, and the like. During the configuration, unique identifying parameters are set. The identifying parameters preferably involve two unique numbers that are generated. One number identifies the communication device, and the other number identifies the user of the device. These two numbers can be randomly generated, or derived from a hardware independent value (such as the MAC address of the device). These numbers are saved into the profile during the configuration operation.

Next, as represented by the next flow diagram box 704, a private/public key pair is generated and saved to the profile, as part of a private/public key encryption processing methodology. Those skilled in the art will be familiar with public key cryptography techniques, with which the devices 304 will be capable. After such initial configuration parameters are set, the communication device will, in the course of operation, establish communication with another device 304, referred to as the "next" device (see the discussion above involving FIG. 3). Thus, as represented by the flow diagram box numbered 706, the originating communication device detects the presence of another (next) device, or initiates a game with the another device.

The next operation, represented by box 708, is a data receipt operation such as described above, in which the communication device creates a data packet or message, or receives originating data from a sending device. As part of the authentication process, the communication device then performs a check to ensure that the data receipt operation does not result in accepting expired data or data that exceeds the permitted "hop" count (box 710). In the case where the communication device has any new data to generate (if for example the two devices have just played a game, and the originating communication device wants to send the new score), the communication device creates a data packet (message) for sending.

The data message contains, in plain text (unencrypted), data comprising: (a) a timestamp; (b) the unique User ID mentioned above; (c) the unique Machine Identifier described above; and (d) any Data that needs to be sent, such as a game score or any other desired data payload for the message. A message digest of the above information, encrypted with the private key saved in the profile of the originating device, is also included in the data message.

The message digest is a "hash value" generated by sending the plain text of a message through a "hash algorithm". This hash value is then encrypted using the private key of the sender. When a person receives the message, the person can create a hash of the message, using the same hash algorithm as the sender. The person can then decrypt the sender's message digest using the sender's public key. If the hash that the receiving person generated matches that which the sender encrypted, then the receiving person knows that: (1) the sender originated the data (the hash was generated using a key only the sender had access to), and (2) the data has not been changed (the hash values matched, and it would not be mathematically feasible for two plain text messages to generate the same hash value.

Those skilled in the art will appreciate that the public key of the originating sender must be communicated to the receiving person, in accordance with operation of the private/public key cryptography methodology. The originating sender's public key can be sent to the receiving person at the time of establishing communications (box 706) or during a registration or sign-up operation, or in some other mechanism that is convenient to the person at the originating communication device and the receiving person.

In the next operation (box 712), the originating communication device provides a list of available messages to the next communication device (receiving person). The receiving device then responds with a list of data messages that are selected to be received. This operation is represented by the next box 714. If the receiving device includes a filter, then this operation would be performed automatically, without user intervention. For example, the filter may be set to reject all duplicate messages, or the filter could be set to reject all messages not addressed to the currently running software application. Other filter operation parameters can be set according to system requirements and desired features.

In the next operation, at box 716, the originating communication device sends all data packets of messages for which the receiving person has indicated a desire to receive. Upon receipt of the requested data, at box 718, the receiving device may authenticate the data sent, if the public key of the originating communication device is known. This will usually be the case, if the receiving device is receiving a message from a known server, or if the receiving device is a network node or other device receiving a message from a known client device. Finally, at box 720, the receiving device saves the data packets to storage of the receiving device.

The present invention has been described above in terms of a presently preferred embodiment so that an understanding of the present invention can be conveyed. There are, however, many configurations for the system and application not specifically described herein but with which the present invention is applicable. The present invention should therefore not be seen as limited to the particular embodiment described herein, but rather, it should be understood that the present invention has wide applicability with respect to network communications generally. All modifications, variations, or equivalent arrangements and implementations that are within the scope of the attached claims should therefore be considered within the scope of the invention.

What is claimed is:

1. A method for transferring data, the method comprising:
receiving originating data sent from an originating device over an ad hoc communication link of an ad hoc originating session with a first communication device, wherein the originating data includes:
data created at the originating device for a receiving device,
a message hop count threshold indicating a number of times the originating data is allowed to be transmitted from one device to another device starting with the originating device, and
a current message hop count that tracks a current number of times the originating data has been transmitted between devices starting with the originating device;
editing the originating data to increment the current message hop count based on the originating data having been transmitted from the originating device to one or more other communication devices;
terminating the originating session between the originating device and the first communication device once the originating data has been received by the first communication device, wherein the originating device is offline upon termination of the originating session;
transmitting, via additional ad hoc communication links of subsequent ad hoc sessions between the first communication device and other communication devices, the originating data until the originating data is received at a subsequent communication device that is capable of connecting to the receiving device via a fixed network;
establishing a receiving session over the fixed network between the subsequent communication device and the receiving device after the originating session has been terminated, wherein the originating device remains offline and does not connect to the fixed network; and
sending the originating data from the subsequent communication device to the receiving device over the fixed network when the current message hop count has not exceeded the message hop count threshold.

2. The method of claim 1, wherein the originating data also includes an expiration time and at least part of the originating data is not sent to the receiving device over the fixed network when the expiration time has passed.

3. The method of claim 1, wherein the originating data also includes time data and at least part of the originating data is not sent to the receiving device over the fixed network when the time data indicates that the origination time of the originating data is greater than a current time by at least a sending limit time value.

4. The method of claim 1, wherein the originating data also includes encrypted validation information that must be decoded prior to sending the originating data to the receiving device over the fixed network.

5. The method of claim 4, wherein decoding the validation information includes an authentication operation.

6. The method of claim 1, wherein a portion of the originating data is selectively rejected prior to being sent to the receiving device over the fixed network in accordance with one or more filters that relate to the content of the originating data.

7. The method of claim 1, wherein the originating data is temporarily maintained in storage when a suitable receiving device is not available to receiving the originating data.

8. The method of claim 7, wherein the originating data includes an expiration time and at least part of the originating data is not stored when the expiration time has passed.

9. The method of claim 7, wherein the originating data includes time data that identifies a first generation time of the originating data and at least part of the originating data is not stored when the sent time is greater than a current time by at least a sending limit time value.

10. A method for transferring data over multiple ad hoc sessions, the method comprising:
   receiving originating data sent from an originating device over a first ad hoc communication link of an ad hoc originating session with a first communication device, wherein the originating data includes:
      data created at the originating device for a receiving device,
      a message hop count threshold indicating a number of times the originating data is allowed to be transmitted from one device to another device starting with the originating device, and
      a current message hop count that tracks a current number of times the originating data has been transmitted between devices starting with the originating device;
   editing the originating data to increment the current message hop count based on the originating data having been transmitted from the originating device to one or more other communication devices;
   terminating the originating session between the originating device and the first communication device once the originating data has been received by the first communication device, wherein the originating device is offline upon termination of the originating session;
   transmitting, via additional ad hoc communication links of subsequent ad hoc sessions between the first communication device and other communication devices, the originating data until the originating data is received at a subsequent communication device that is capable of connecting to the receiving device via a fixed network;
   establishing a receiving session over the fixed network between the subsequent communication device and the receiving device after the originating session has been terminated, wherein the originating device remains offline and does not connect to the fixed network; and
   sending the originating data from the subsequent communication device to the receiving device over the fixed network when the current message hop count has not exceeded the message hop count threshold.

11. The method of claim 10, wherein the originating data also includes an expiration time and at least part of the originating data is not sent to the receiving device over the ad hoc receiving session when the expiration time has passed.

12. The method of claim 10, wherein the originating data also includes time data and at least part of the originating data is not sent to the receiving device over the ad hoc receiving session when the time data indicates that the origination time of the originating data is greater than a current time by at least a sending limit time value.

13. The method of claim 10, wherein the originating data also includes encrypted validation information that must be decoded prior to sending the originating data to the receiving device over the ad hoc receiving session.

14. The method of claim 13, wherein decoding the validation information includes an authentication operation.

15. The method of claim 10, wherein a portion of the originating data is selectively rejected prior to being sent to the receiving device over the ad hoc receiving session in accordance with one or more filters that relate to the content of the originating data.

16. The method of claim 10, wherein the originating data is temporarily maintained in storage when a suitable receiving device is not available to receiving the originating data.

17. The method of claim 16, wherein the originating data includes an expiration time and at least part of the originating data is not stored when the expiration time has passed.

18. The method of claim 16, wherein the originating data includes time data that identifies a first generation time of the originating data and at least part of the originating data is not stored when the sent time is greater than a current time by at least a sending limit time value.

* * * * *